United States Patent [19]
Kondoh

[11] Patent Number: 5,462,763
[45] Date of Patent: Oct. 31, 1995

[54] METHOD FOR MANUFACTURING A LAMINATED COIL

[75] Inventor: Masatoshi Kondoh, Ohbu, Japan

[73] Assignee: Sumitomo Heavy Industries Ltd., Tokyo, Japan

[21] Appl. No.: 390,427

[22] Filed: Feb. 17, 1995

Related U.S. Application Data

[63] Continuation of Ser. No. 66,246, May 25, 1993, abandoned.

[30] Foreign Application Priority Data

May 28, 1992 [JP] Japan ................................. 4-136987

[51] Int. Cl.⁶ ........................................... B05D 5/12
[52] U.S. Cl. ........................ 427/96; 427/116; 427/126.2; 427/419.6
[58] Field of Search .................. 427/96, 116, 126.2, 427/419.6

[56] References Cited

U.S. PATENT DOCUMENTS

| 4,795,670 | 1/1989 | Nishigaki et al. | 428/209 |
| 5,008,151 | 4/1991 | Tominaga et al. | 428/343 |

FOREIGN PATENT DOCUMENTS 64-59902  3/1989  Japan ................. H01F 5/00

OTHER PUBLICATIONS

Abstract of Japanese 89–059902, Mar. 1989.
Jones, "Hybrid Circuit Design and Manufacture" 1982 Marcel Dekker, Inc. pp. 9–36.

*Primary Examiner*—Benjamin Utech
*Attorney, Agent, or Firm*—Nikaido, Marmelstein, Murray & Oram

[57] ABSTRACT

A laminated coil for motor having heat resistance and capable of voluminous production at a moderate cost, in which a conductive pattern 116 for coil is formed on a glass substrate 111, a glass coating 112 is applied on the conductive pattern 116 for oil, and further another conductive pattern 117 for coil is formed again on this glass coating 112. In a similar manner a glass coating 113, a conductive pattern 118 for coil, glass coating 114, and a conductive pattern 119 for coil are repetitively formed thereon, and finally a glass coating 115 is applied as a top coating, thereby making coils by thus laminating glass which have a high heat resistance and reliability for use under various environmental conditions. Furthermore, since, unlike a ceramic material, no baking as one body is required, there will never take place a disadvantage as the relation between the basing temperature of the ceramic and the melting point of the conductor for oil, thereby enabling enhancing the yield of coil production.

2 Claims, 3 Drawing Sheets

5,462,763

METHOD FOR MANUFACTURING A LAMINATED COIL

This application is a continuation of application Ser. No. 08/066,246 filed May 25, 1993 now abandoned.

BACKGROUND OF THE INVENTION

1. Field of the Invention

The present invention relates to a laminated coil with an excellent durability for motor, a method for manufacturing the coil, and further a motor using the coil.

2. Description of the Prior Art

A brushless motor generally comprises, as shown in FIG. 4, a rotating shaft 2, a rotor 4 composed of permanent magnets formed integral with this rotating shaft 2, and a stator 6 composed of a coil (armature coil) facing the rotor 4.

In this type of brushless motor, the coil is composed of a winding using a wire. Recently, however, there has been proposed such a method, thanks to improvements in printed wiring technology, for forming a coil sheet 14 by printing a conductor pattern for coil as a printed pattern on a film 10 produced of an .epoxy resin, polyester resin, polyimid resin, etc. and then, as shown in FIG. 5, forming the coil by laminating a number of said coil sheets 14. This method is disclosed in for example Japanese Patent Laid-Open No. SHO 57-68565, 57-186940, 57-68656, or 5833958.

The laminated coil as described above requires no winding of a metal wire on the core unlike prior-art coils, and winding density is high, accordingly, is advantageous for obtaining a small-type motor with windings of high winding density.

The coil of prior art described above, however, has such a problem that since it is required to laminate plural coil sheets 14 by the use of an adhesive, it is required a process for forming a uniform layer of adhesive on each sheet surface and attaching these coil sheets 14. As a result the cost of the coil is very high. Also, because the coil sheet, being made of a plastics or a composite material, has a low heat resistance, and moreover is liable to be affected by heat caused by an iron loss or a copper loss or by an ambient temperature, a motor operation becomes unstable so that using condition such as the ambient temperature is limited.

Therefore, in an attempt to solve the above-described problem of the prior-art laminated coil, there has been proposed such a laminated coil, in Japanese Patent Laid-Open No. SHO 64-59902, that is produced by forming a conductive pattern for coil on a green sheet obtainable from a ceramic powder, through a screen printing, photolithography, or plating technique, and by laminating such plural green sheets on which the conductive pattern for coil has been formed, and then by baking the thus laminated green sheets as one body.

However, a ceramic material, for example even alumina, to be used for such a multilayer substrate is generally too expensive to use for this type of small motors. Furthermore, when the above-described method of manufacturing is adopted, the melting point of the conductor for coil is required to be higher than that of the baking temperature for the ceramic material. For example, in the case of a combination of the alumina (baking temperature, 1600° C.) and Au (melting point, 1063° C.), Au melts in the ceramic, resulting in being small spheroids or evaporating.

Generally, there is such a tendency that the higher the melting point of a conductor, the greater the resistance of the conductor, and reversely the lower the melting point, the less the resistance. With a loss taken into consideration, of course, a metal of less conduction resistance is demanded for use as a conductor. Therefore, for a ceramic material of the green sheet, it is demanded the ceramic material which is baked at a lower temperature than the melting point of Au and Cu which are good conductors. This means that the laminated coil can be composed only of a further special, expensive ceramic material. Therefore, it should be noted that the technique disclosed in Japanese Patent Laid-Open No. SHO 64-59902 previously stated for laminating plural green sheets and baking them as one body is infeasible because of expensiveness of the laminated coil.

SUMMARY OF THE INVENTION

The present invention has been accomplished in view of the problems inherent to heretofore known techniques and therefore it is an object of the present invention to solve the problems by providing a laminated coil for motor, a method for manufacturing a laminated coil with a high heat resistance for motor, and furthermore a motor using this coil.

The present invention has solved the problem described above, by providing a laminated coil for motor produced by embedding and laminating the conductive pattern for coil within a non ceramic glass substrate, to which an exciting current is supplied.

This laminated coil for motor can be fabricated by repeating the formation of a conductive pattern for coil on a glass substrate, application of a glass coating on the conductive pattern for coil, and further formation of the conductive pattern for coil on this glass coating, and finally by applying a top glass coating.

In the laminated coil for motor according to the present invention, glass is used as a new material of coating of a small-sized motor coil. Since this coil with laminated glass coatings has a high heat resistance to plastics and composite materials and a good heat conductivity (although not so high as that of a ceramic material), a motor using the laminated coil can obtain a steady torque. Also a motor having reliability with respect to environments is obtainable.

Glass is a more practicable material than the ceramic material, for manufacturing very inexpensive, large-area substrates as laminated coils for motors. Also, the method of baking laminated sheets into one body is not adopted differing from the ceramic material. Therefore, there will never arise a problem as to a relation between the baking temperature of ceramics and the melting point of conductors for coils. To fabricate a glass laminated coil, it is sufficient to raise up to the baking temperature for baking the conductive pattern for coil on a glass substrate and the glass coating, and to repeat the application of glass coating thereon, without melting of the conductor for coil into spheroids or evaporating. It is, therefore, possible to maintain a good stability (yield) of coil manufacture.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Hereinafter preferred embodiments of a laminated coil for motor according to the present invention will be explained in detail with reference to the accompanying drawings.

Figure 2:
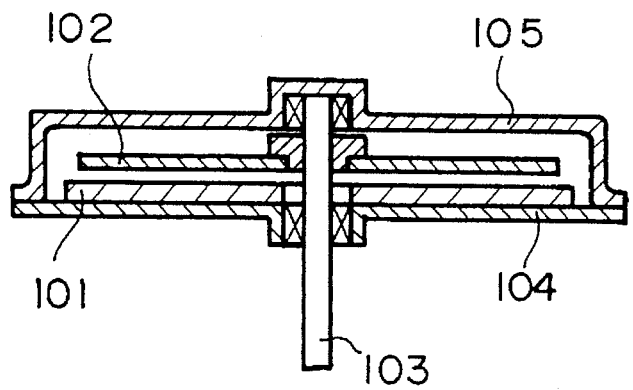
FIG. 2 is a front view showing an example of a conductive pattern for coil deposited on a glass substrate.

FIG. 2 shows a schematic section of a brushless motor embodying the present invention. In this drawing, 101 refers to an exciting coil, 102 denotes a magnet rotor, 103 is a rotating shaft, and 104 and 105 represent housings.

The exciting coil 101 is mounted on the housing 104. The magnet rotor 102 is disposed facing the exciting coil 101, and mounted on the rotating shaft 103 through a bushing. The rotating shaft 103 is rotatably mounted on the housings 104 and 105 through bearings.

Figure 1:
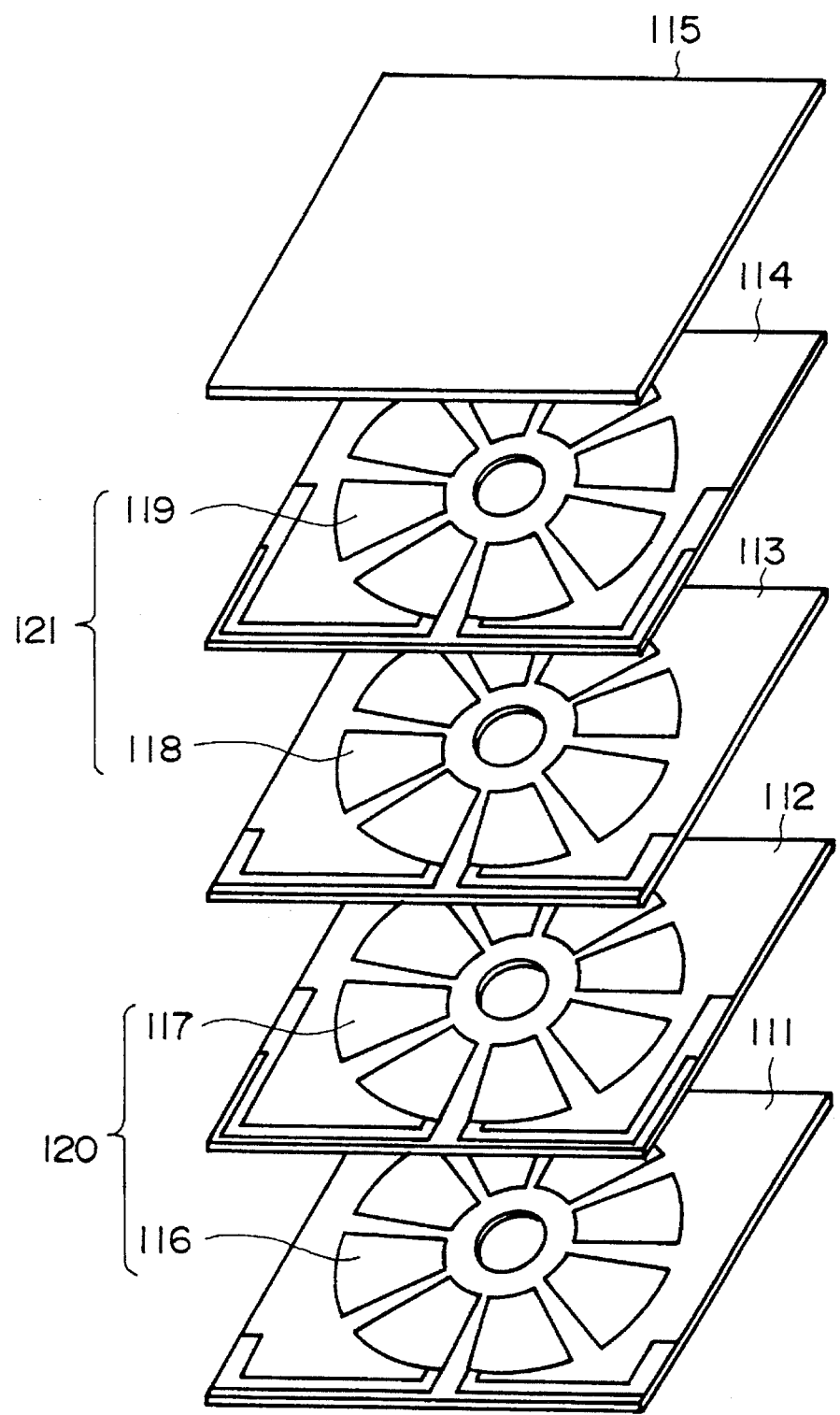
FIG. 1 is an exploded perspective view of a laminated coil for motor according to the present invention.

The exciting coil 101 is composed of a multilayer glass substrate fabricated by laminating and embedding four layers of conductive patterns for coil inside as shown in FIG. 1.

To give a more concrete explanation, FIG. 1 shows a process of successive formation of conductive patterns for coil. First, a conductive pattern 116 for coil is formed on a glass substrate 111, then a glass coating 112 for insulation is formed on the conductive pattern 116, and furthermore a conductive pattern 117 for coil is formed on this glass coating 112. Glass coatings 113 and 114 and conductive patterns 118 and 119 for coil are formed by repeating this process. The top pattern is covered by a glass coating 115 to insure safety in insulation.

Figure 3:
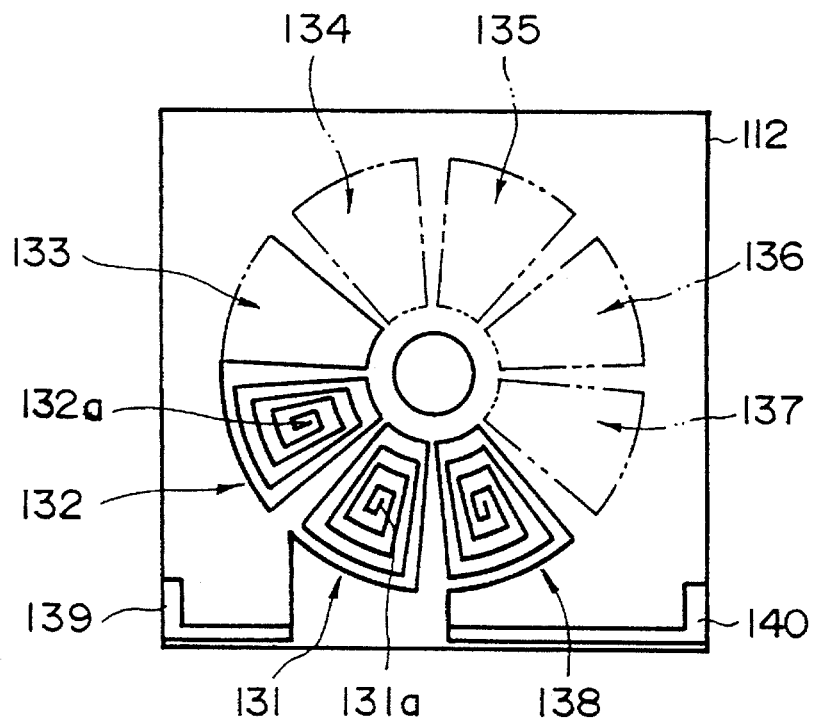
FIG. 3 is a sectional view of a brushless motor according to the present invention.
Figure 4:
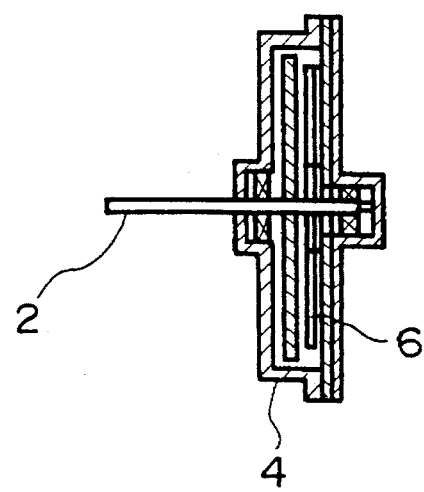
FIG. 4 is a sectional view of a prior-art brushless motor.
Figure 5:
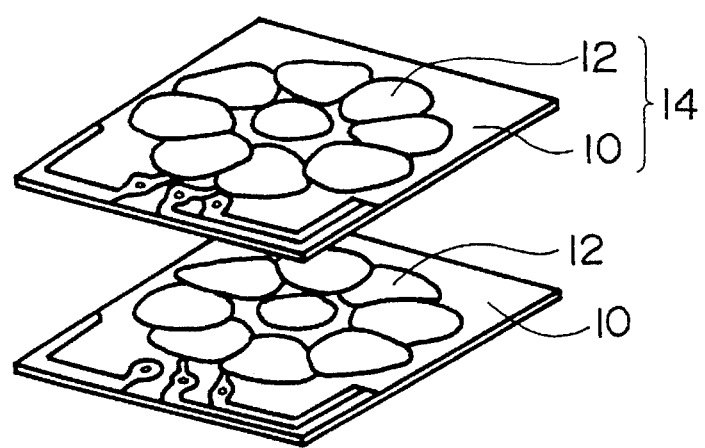
FIG. 5 is an exploded perspective view showing an example of a laminated coil using prior-art coil sheets.

FIG. 3 shows the second-layer conductive pattern 117 for coil. In the present embodiment, the conductive patterns 116 and 117 for coil form a coil for one phase of applied voltage. A first spiral coil 131 to be connected to a lead-out electrode 139 is formed on a glass coating 112 through a printed wiring technology such as the screen printing, photolithography, and plating techniques. The first spiral coil 131 is connected on the center side to the conductive pattern 116 for coil on the glass substrate 111 of another layer disposed at the bottom through a through hole electrode 131a. The bottom spiral coil (not illustrated) is formed such that a magnetic flux produced therefrom will overlap a magnetic flux from the top coil 131. A first coil section is composed of a pair of coils of two layers, top and bottom.

A second coil section also has a pair of second spiral coils 132 having the same shape of the first spiral coil 131. That is, in the bottom glass substrate 111, the spiral coil 132 (second bottom) is connected (not illustrated) to the first coil section at the outer peripheral section of the coil, and is connected to the second spiral coil 132 of the top surface through the through hole electrode 132a on the center side thereof. Then, the second spiral coil 132 of this top surface is connected at the outer periphery to the spiral coil 133 of the third coil section.

In a similar manner, spiral coils 133 to 138 of the third to eighth coil sections are formed in succession; the final spiral coil 138 of the eighth coil section is connected to the other lead-out electrode 140. All of the spiral coils 131 to 138 on the two glass layers are electrically connected in series across the lead-out electrodes 139 and 140.

The first and second spiral coils 131 and 132 are of the same shape. However, the first spiral coil 131 is wound from the top surface toward the bottom surface, while the second spiral coil 132 is reversely wound from the bottom surface toward the top surface. Therefore the current flows in a reverse direction, and the magnetic flux is produced in the opposite direction of that of the first spiral coil 131. That is, from all the spiral coils of odd numbers 131, 133, 135 and 137, the magnetic flux is produced in the same direction, which is reverse to that produced from the spiral coils of even numbers 132, 134, 136 and 138.

A U-phase coil 120 is formed by the spiral coils 131 to 138 on these two layers of glass coatings. In a similar manner a one-phase coil is formed by the use of other two layers of glass coatings 113 and 114, constituting a V-phase coil 121 electrically shifted by for example 90 degrees from the U-phase coil. The 90-degree shift is effected by shifting the circuit of a driving current for the U and V phases, or by mechanically shifting the coil 120 formed on the glass substrates 111 and 112 from the coil 121 on the glass substrates 113 and 114 in FIG. 1.

When the driving current is supplied between the lead-out electrodes 139 and 140, there occurs a U-phase rotating magnetic field from the coil 120, and an electrically 90-degree shifted V-phase rotating magnetic field from the coil 121. These magnetic fields and a magnetic field by the magnet rotor 102 combine to produce an attraction or a repulsion, thereby producing a torque.

In the present embodiment, all of the spiral coils on the coils 120 and 121 are electrically connected in series. However, since the conductive patterns for coil are formed on the top and bottom surfaces by the use of a through hole electrode, the conductors connected across adjacent coils are not installed astride the coil pattern; and further since the magnetic fields of the top and bottom coils are overlapped, it is possible to improve efficiency by that.

In the present embodiment, the constitution of the laminated coil for two-phase driving (90-degree energization) is shown; however, it is to be noted that the constitution may be changed to that of a laminated coil for three-phase driving, and further that each coil phase composed of two layers of glass substrates may be made of many more layers of glass substrates.

Furthermore, the brushless motor described above in the present embodiment may be changed to a motor having brushes, or to a linear motor. What is important is to use a laminated coil of glass substrates as an exciting coil for motor and to construct the motor using the coil.

According to the laminated coil for motor pertaining to the present invention, as heretofore explained, the laminated coil using glass substrates has a high heat resistance than the coil using plastics or composite material, and also has a good thermal conductivity (although not so high as the ceramics). The motor using such a coil thus made can produce a stabilized torque with high reliability in use under various environmental conditions.

Furthermore, the glass material, being usable for making large-area substrates and coatings at a very low cost as compared with the ceramic material, is highly practicable as the laminated coil for motor in the respect of manufacturing cost. Also, since, unlike the ceramic material, no baking process is required, there never exists said disadvantage as the relation between the ceramic baking temperature and the melting point of conductors for coil.

Furthermore, in the case of the glass lamination, it is sufficient to raise the baking temperature to a level at which the conductive patterns for coil are baked on the glass substrates; therefore there will never occur such a problem as spheroidizing or evaporation of the conductive pattern for coil. Consequently, it becomes possible to maintain the stabilization (yield) of coil fabrication.

What is claimed is:

1. A method for manufacturing a laminated coil for a motor, said method comprising steps of:

forming a first conductive pattern for a coil on a glass substrate;

applying a first glass coating on said first conductive pattern;

forming a second conductive pattern on said first glass coating; and applying a second glass coating on said second conductive pattern;

heating the first conductive pattern, the first glass coating, the second conductive pattern, and the second glass coating, only to a temperature wherein the first conductive pattern becomes baked on the first glass substrate, and the second conductive pattern becomes baked on the first glass coating, wherein said first and second conductive patterns are configured to create rotating magnetic fields, such that a rotating torque is produced in combination with a rotor.

2. A method for manufacturing a laminated coil for a motor as recited in claim 1, wherein a plurality of second conductive patterns and second glass coatings are alternatingly applied, and the last of said plurality of second conductive patterns is the top conductive pattern, said top conductive pattern being coated with a final glass coating.

* * * * *